US011928662B2

(12) United States Patent
Slaughter et al.

(10) Patent No.: US 11,928,662 B2
(45) Date of Patent: Mar. 12, 2024

(54) END USER TRAINING FOR COMPUTER VISION SYSTEM

(71) Applicant: Toshiba Global Commerce Solutions Holdings Corporation, Tokyo (JP)

(72) Inventors: J. Wacho Slaughter, Raleigh, NC (US); Philip S. Brown, Cary, NC (US); Michelle M. Crompton, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

(21) Appl. No.: 17/490,427

(22) Filed: Sep. 30, 2021

(65) Prior Publication Data
US 2023/0095037 A1    Mar. 30, 2023

(51) Int. Cl.
*G06Q 20/20*        (2012.01)
*G06Q 30/0601*    (2023.01)
*G06N 20/00*       (2019.01)

(52) U.S. Cl.
CPC ........ *G06Q 20/208* (2013.01); *G06Q 30/0633* (2013.01); *G06Q 30/0641* (2013.01); *G06N 20/00* (2019.01)

(58) Field of Classification Search
CPC ............. G06Q 20/208; G06Q 30/0633; G06Q 30/0641
See application file for complete search history.

(56) References Cited

U.S. PATENT DOCUMENTS

| | | | |
|---|---|---|---|
| 7,537,158 B1 * | 5/2009 | Cox ................... | G06Q 30/0603 235/383 |
| 7,909,248 B1 * | 3/2011 | Goncalves ........... | G07G 1/0063 235/462.14 |
| 8,474,715 B2 * | 7/2013 | Goncalves ........... | G07G 1/0063 235/462.14 |
| 8,732,024 B2 * | 5/2014 | Jacobs .................... | G07G 1/01 705/23 |

(Continued)

FOREIGN PATENT DOCUMENTS

WO    WO-2014108923 A1 *    7/2014    ......... G06F 19/3475

OTHER PUBLICATIONS

Wu, Bing-Fei, et al. "An intelligent self-checkout system for smart retail." 2016 International Conference on System Science and Engineering (ICSSE). IEEE, 2016. (Year: 2016).*

(Continued)

*Primary Examiner* — Asfand M Sheikh
(74) *Attorney, Agent, or Firm* — Patterson + Sheridan, LLP

(57) ABSTRACT

Embodiments herein describe providing feedback to a shopper at a POS system using a computer vision system. Many items at a store may lack barcodes or other identifying marks such as produce. The shopper may have to perform an action to identify the item to the POS system. The computer vision system can double check the identify provided by the shopper to reduce mistakes and deter nefarious actors. If the computer vision system cannot independently confirm that the item being purchased matched the identity provided by the shopper, the POS system can display a graphical user interface (GUI) that includes an image of the item captured by the computer vision system along with identification data of the item identified by the shopper. This gives the shopper a chance to correct any mistakes.

9 Claims, 10 Drawing Sheets

(56) References Cited

U.S. PATENT DOCUMENTS

| | | | | |
|---|---|---|---|---|
| 8,746,557 B2* | 6/2014 | Connell, II | .......... | G07G 1/0063 |
| | | | | 235/383 |
| 8,876,001 B2* | 11/2014 | Herwig | .................... | G07G 1/14 |
| | | | | 235/383 |
| 9,477,955 B2* | 10/2016 | Goncalves | .............. | G06T 7/001 |
| 9,489,401 B1* | 11/2016 | Garcia | ................. | G06V 10/462 |
| 10,607,116 B1* | 3/2020 | Omer | ..................... | G06V 10/764 |
| 11,481,751 B1* | 10/2022 | Chaubard | .................. | G06V 10/82 |
| 2005/0189411 A1* | 9/2005 | Ostrowski | ............... | G07G 3/00 |
| | | | | 235/383 |
| 2009/0039164 A1* | 2/2009 | Herwig | .................... | G07G 1/14 |
| | | | | 235/462.41 |
| 2010/0002902 A1* | 1/2010 | Landers, Jr. | ............. | G07G 1/14 |
| | | | | 382/209 |
| 2010/0013676 A1* | 1/2010 | Do | ..................... | G06F 3/04883 |
| | | | | 341/20 |
| 2010/0086192 A1* | 4/2010 | Grigsby | .................. | G06F 16/58 |
| | | | | 707/E17.014 |
| 2010/0217678 A1* | 8/2010 | Goncalves | .......... | G07G 1/0063 |
| | | | | 382/209 |
| 2012/0233003 A1* | 9/2012 | Calman | .................. | G06Q 30/06 |
| | | | | 705/16 |
| 2012/0243739 A1* | 9/2012 | Fukuchi | ................. | G06V 20/20 |
| | | | | 382/103 |
| 2013/0193210 A1* | 8/2013 | Lizaka | ................. | G07G 1/0045 |
| | | | | 235/454 |
| 2014/0023241 A1* | 1/2014 | Sugasawa | ............ | G06V 10/772 |
| | | | | 382/110 |
| 2014/0064569 A1* | 3/2014 | Sugasawa | ............ | G06V 20/00 |
| | | | | 382/110 |
| 2014/0126773 A1* | 5/2014 | Miyakoshi | ............... | G06K 9/00 |
| | | | | 382/103 |
| 2014/0153786 A1* | 6/2014 | Takeno | ................ | G06V 10/987 |
| | | | | 382/110 |
| 2015/0054959 A1* | 2/2015 | He | ......................... | G06V 10/40 |
| | | | | 348/150 |
| 2015/0109451 A1* | 4/2015 | Dhankhar | .......... | G06Q 30/0641 |
| | | | | 348/150 |
| 2015/0193761 A1* | 7/2015 | Svetal | ................... | G06Q 20/208 |
| | | | | 705/23 |
| 2015/0235110 A1* | 8/2015 | Curtis | .................... | G06V 20/30 |
| | | | | 382/224 |
| 2016/0110703 A1* | 4/2016 | Herring | ................ | G07G 1/0045 |
| | | | | 705/23 |
| 2016/0225286 A1* | 8/2016 | Dayal | ..................... | G06V 20/20 |
| 2016/0328660 A1* | 11/2016 | Huang | .................. | G06N 20/00 |
| 2017/0083891 A1* | 3/2017 | Moro | .................. | G07G 1/0009 |
| 2018/0157881 A1* | 6/2018 | Beghtol | ............ | G06K 7/10792 |
| 2018/0165829 A1* | 6/2018 | Hong | .................. | G06V 10/772 |
| 2018/0204054 A1* | 7/2018 | Takeno | .................. | G06V 40/23 |
| 2019/0042079 A1* | 2/2019 | Choi | ..................... | G06F 3/0488 |
| 2019/0125106 A1* | 5/2019 | Bode | ...................... | G07G 3/003 |
| 2020/0242392 A1* | 7/2020 | Scott | ...................... | G06N 3/045 |
| 2020/0349820 A1* | 11/2020 | Speagle | .......... | G08B 13/19658 |
| 2021/0042528 A1* | 2/2021 | Kundy | ................. | G06K 9/6201 |
| 2021/0117948 A1* | 4/2021 | Voss | ......................... | G06N 3/08 |
| 2021/0248579 A1* | 8/2021 | Moritz | ................. | G06Q 20/208 |
| 2022/0277313 A1* | 9/2022 | Migdal | .................. | G06Q 20/20 |
| 2023/0005342 A1* | 1/2023 | Brakob | .................. | G06V 20/52 |

OTHER PUBLICATIONS

Bobbit, Russell, et al. "Visual item verification for fraud prevention in retail self-checkout." 2011 IEEE Workshop on Applications of Computer Vision (WACV). IEEE, 2011. (Year: 2011).*

G. Mortimer, P. Dootson, "Watch yourself: the self-surveillance strategy to keep supermarket shoppers honest," dated Jun. 14, 2020, pp. 1-5.

John Honovich, "Creepy or Necessary?—Target/Walmart Self Check Out Cameras," IPVM, Dated Nov. 22, 2017, pp. 1-18.

Malay Kundu, "How to Stop Those Self-Checkout Thieves," The Retail Touchpoints Network, Dated: Aug. 12, 2014, pp. 1-6.

Mike Kilby, "How to Prevent Retail Self Checkout Theft in your Grocery Store," TRUNO, Dated: Dec. 12, 2019, pp. 1-6.

* cited by examiner

END USER TRAINING FOR COMPUTER VISION SYSTEM

BACKGROUND

A point of sale (POS) system provides a platform for a customer to pay for goods or services. The POS system can include a scanner used to scan a barcode, quick response (QR) code, or other identifying mark to add an item to a checkout list. However, some items may not have barcodes, such as unpackaged items like fresh fruit and vegetables. Stickers with barcodes can be added to the items, but the stickers might fall off and the barcodes are often smaller and more difficult to scan. Other items, such as large or unusually shaped items may have barcodes located at difficult to scan locations. For items like these, the cashier (or customer at a self-checkout POS system) may have to manually tell the POS system the item being purchased, such as using a price look-up (PLU) code or spelling the name of the item using a user interface.

DETAILED DESCRIPTION

Figure 1:
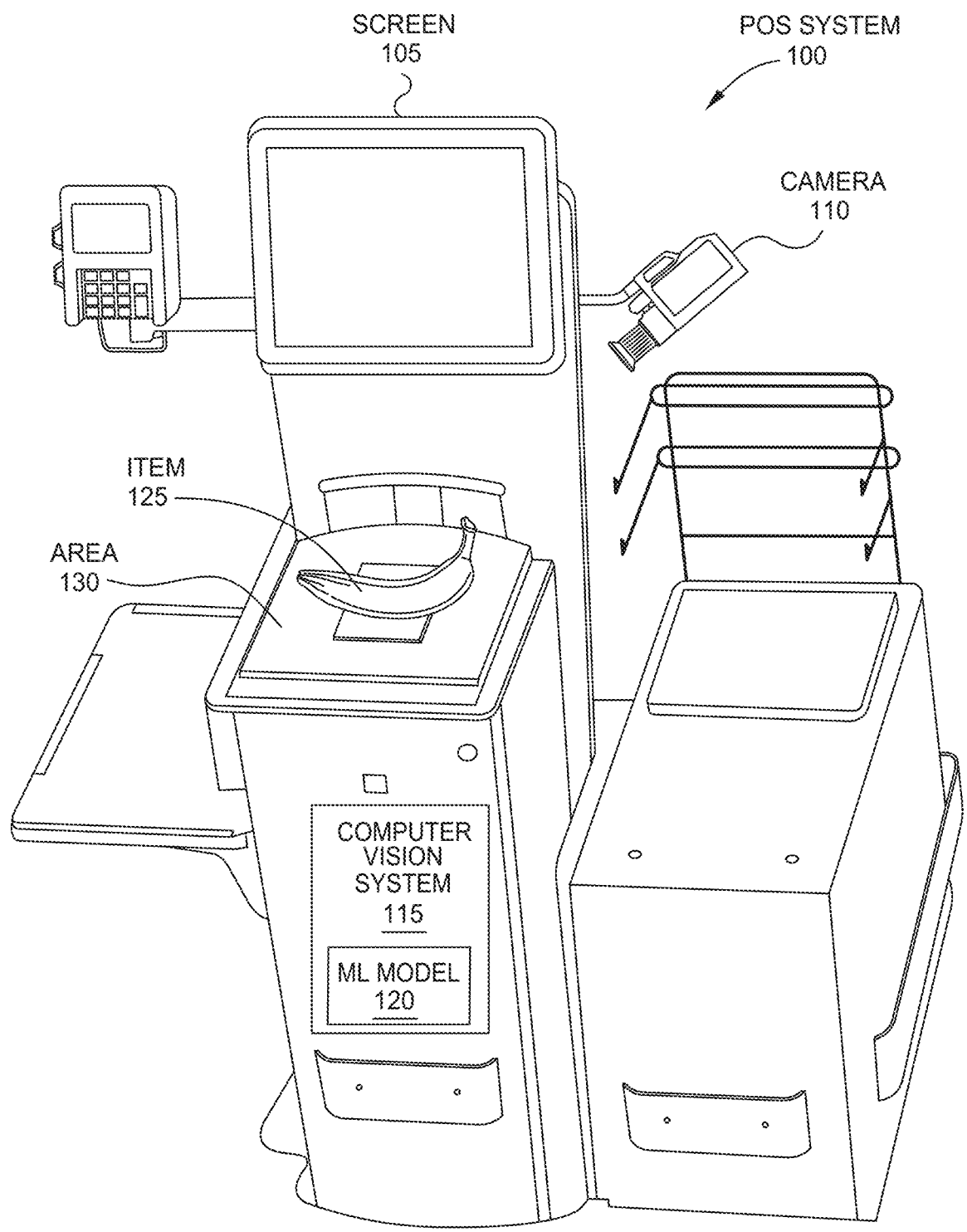
FIG. 1 illustrates a POS system that uses a machine learning (ML) model to identify an item, according to one embodiment.

Embodiments herein describe providing feedback to a shopper at a POS system using a computer vision system. Newer POS systems have computer vision systems that identify items from an image captured by a camera at the POS system. The computer vision systems can use machine learning (ML) models to identify (or classify) the item. The computer vision system can supplemental the barcode scanner typically used at POS systems.

Many items at a store (such as fruit, vegetables, garden tools, etc.) may lack barcodes or other identifying marks. To identify the item, the shopper may have to perform an action such as entering a PLU code, spelling out the name of the item, or selecting a picture of the item. The shopper may make a mistake when performing this action such as mistyping the PLU code or selecting the wrong image. Also, the shopper may be a nefarious actor who is attempting to identify the item as a cheaper item (e.g., the shopper placed an expensive meat item on the POS system but told the POS system it is a cheaper produce item).

In the embodiments herein, a computer vision system double checks the item identity provided by the shopper. The computer vision system can capture an image of the item and use a ML model to identify the item in the image. If the item identified by the computer vision system does not match the identification provided by the shopper, or the computer vision system was unable to identify the item, the POS system can generate and display a graphical user interface (GUI). In one embodiment, the GUI displays the image of the item captured by the computer vision system side-by-side with identification data (e.g., a representative image, a textual description of the item, or a PLU code) of the item identified by the shopper. If the system continues to detect non-matching items, the POS system can then raise a flag with a store employee who can then confirm the computer vision system was mistaken and allow the shopper to proceed with checking out.

Advantages of an Automated ML Model Update Process

Advantageously, the system generates a GUI (or a series of GUIs) that display selected items with items identified by the computer vision system. Doing so can reduce the checkout time of the shopper since the store employee may currently be busy helping another shopper. Further, the GUI improves the performance of the POS system by reducing errors in the checkout process. Thus, the GUI can reduce the processing time of the POS system (which can save power, reduce cycle time, and improve efficiency) by generating the GUI from comparing the identified item with the item identified by the computer vision system.

Additionally, the GUI discourages nefarious actors who may be attempting to pass off an expensive item as a cheaper item. By displaying the image of the item captured by the computer vision system with the representative image of the item identified by the shopper, the nefarious actor can see the computer vision system has detected the items do not match. This provides a subtle warning that if the misidentification is not corrected, a store employee will be alerted. As such, the embodiments herein can also discourage theft at self-checkout POS systems, which can also improve the processing time, efficiency, and cycle time of the POS system relative to other theft deterrent techniques.

FIG. 1 illustrates a POS system 100 that uses a ML model 120 to identify an item, according to one embodiment. FIG. 1 illustrates a self-checkout POS system 100, but this is just one example of a suitable type of POS system.

The POS system 100 includes one or more scanners (not labeled) disposed under, above, or around an item scanning area 130. In one embodiment, the scanners are barcode or QR code scanners, but can be any scanners that detect identifying marks on an item 125. In one embodiment, the item scanning area 130 includes a scale for measuring the weight of the item 125.

In addition to the scanner(s), the POS system 100 includes a camera 110 that captures images of the item scanning area 130. The camera 110 can be part of a computer vision system 115 that processes the images to identify the item 125. In this example, the computer vision system 115 operates in tandem with, or is supplemental to, the scanners to identify the item 125.

The computer vision system 115 includes the ML model 120 which receives an image captured by the camera 110 as an input and outputs a prediction or classification of the item 125. As discussed in detail below, the computer vision system 115 can double check an identification of the item 125 provided by the shopper. For example, because the item 125 may not have a barcode, the customer may use a GUI displayed on the screen 105 (e.g., a touch screen) to identify the item. In one example, the computer vision system 115 identifies the item and determines that the identification associated with the item matches the identification provided by the computer vision system 115. As an alternative to receiving the item information associated upon scanning a barcode, the computer vision system 115 identifies the item 125.

In the case where the item 125 is a fruit or vegetable, the ML model 120 determines the type of fruit or vegetable (e.g., banana). For some types of fruits or vegetables the ML model 120 may be able to provide a precise identification (e.g., the item 125 is a banana), but for other types of items the ML model 120 determines multiple potential identifications of the item. For example, the ML model 120 may be able to determine that the item 125 is an apple, (e.g., HONEYCRISP® apple or PINK LADY® apples) or determine a list of items that could potentially be the apple due to similar characteristics that are identified by the ML model, such as size, shape, visual appearance, color, nutritional value, organic or non-organic classification, and the like.

Once the item 125 is identified, the POS system 100 can add it to the customer's checkout list. In one embodiment, the POS system 100 may weigh the item first, or the computer vision system 115 may count the number of items 125 currently in the item scanning area 130 before adding the item to the checkout list.

In one embodiment, the ML model 120 is trained to recognize a set number of items. In some examples, the ML model represents a convolution neural network, deep neural network, k-means clustering, support vector machine, or any other type of ML algorithm suitable for computer vision. During a training stage, annotated training data can be processed by the ML model 120 so it can learn to distinguish the items. The ML model 120 can be updated as additional items are added to a store's inventory.

While many of the examples herein describe using the computer vision system 115 and the ML model 120 to identify unpackaged items (e.g., fresh fruits or vegetables, hammers, garden tools, etc.), it can also be used to identify packaged items such as cereal boxes, soup cans, bagged pasta, nails, light bulbs, etc. The ML model 120 can be trained to distinguish between two different types of cereal, or brands of light bulbs, based on identifying and distinguishing the characteristics of the items in the images captured by the camera 110. In one example, the characteristics of the items include the item's associated size, brand, height, weight, dimensions, color, and the like. As described below, the identification provided by the ML model 120 can be used by the POS system 100 to provide feedback to shoppers to ensure they enter in the correct items.

In one embodiment, the POS system comprises one or more processors (e.g., one or more processing elements or central processing units (CPUs) containing one or more processing cores) and memory (e.g., volatile memory, non-volatile memory, or combinations thereof) that stores an application which performs the embodiments described herein.

Figure 2:
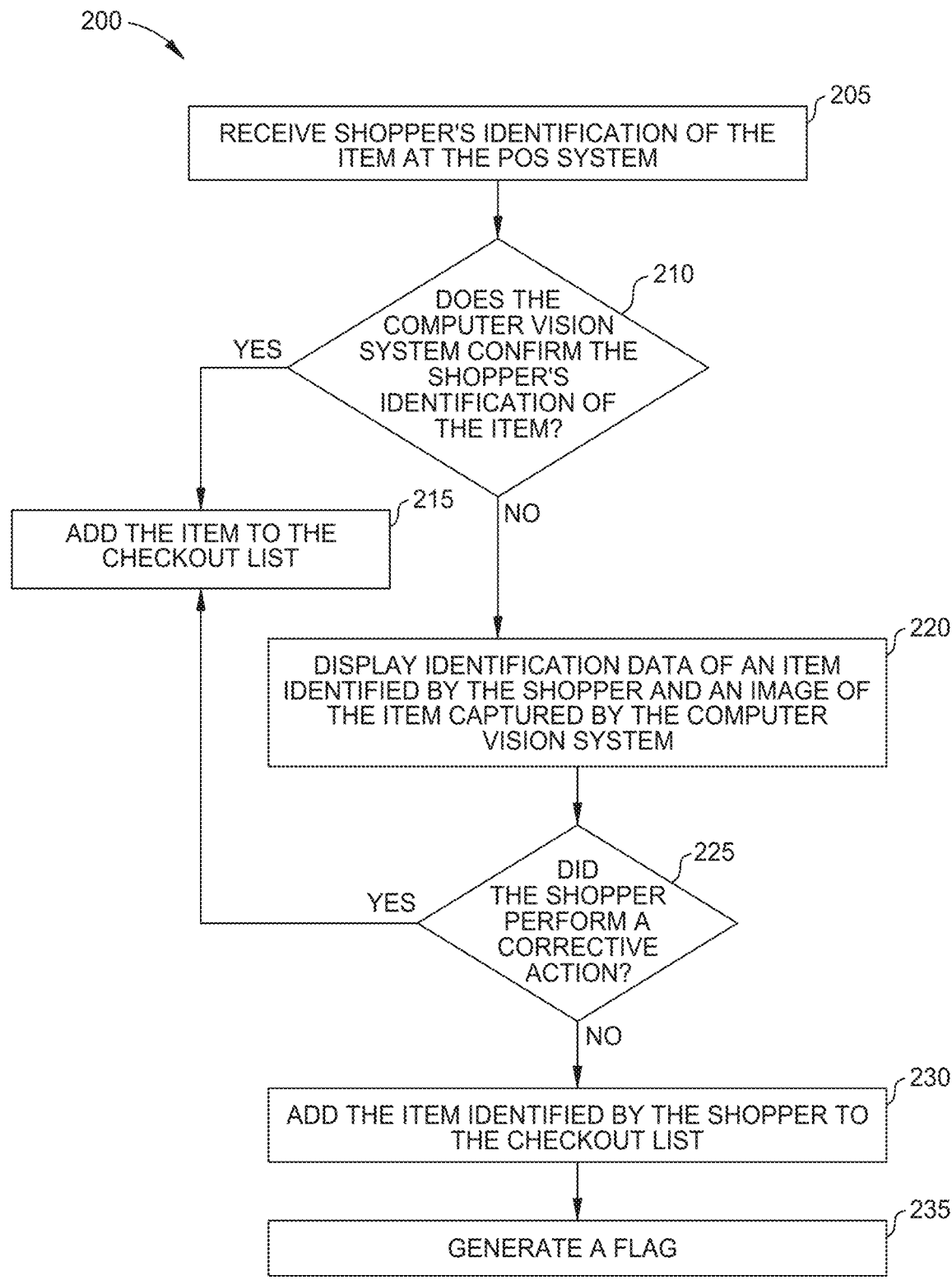
FIG. 2 is a flowchart for providing a shopper with feedback using a computer vision system, according to one embodiment.

FIG. 2 is a flowchart of a method 200 for generating a customized GUI for display in a POS system using a computer vision system, according to an embodiment. At block 205, the POS system receives the shopper's identification of the item. In one embodiment, the POS system may include a touchscreen or other input/output (I/O) device that the shopper can use to input the item identification. For example, the item identification includes the name of the item, a picture of the item, or the PLU code for the item. The embodiments herein are not limited to any particular I/O device for receiving the shopper's input.

At block 210, the POS system determines whether the computer vision system confirms the received identification of the item. For example, the POS system can capture an image of the item and transmit this image to the computer vision system. The ML model in the computer vision system can then process the image and classify or identify the item. For example, the ML model can predict that the item is a banana based on an image captured by the camera. The ML model can use, e.g., a trained neural network to evaluate the image and then identify the item.

The POS system can compare the prediction made by the computer vision system to the identification provided by the shopper. For example, if the computer vision system identified the item as a banana, plantain, or summer squash (e.g., a plurality of potential items) and the received identification indicated the item was summer squash, then the POS system determines there was a match. In that case, the method 200 proceeds to block 215 where the POS system adds the item to the checkout list of the shopper.

In another example, when the received identification does not match the prediction made by the computer vision system, or the computer vision system was unable to accurately identify the item, the method proceeds to block 220. For example, while most stores provide transparent plastic bags for carrying unpackaged produce which enables the computer vision system to identify the object, the shopper may have double bagged the produce or used their own non-transparent bag to hold the produce. In that situation, the computer vision system may be unable to identify the item.

In another example, an item may be placed in the field of view of the camera that the ML model is not trained to recognize. For instance, the ML model may be trained to recognize unpackaged produce but packaged produce may be placed on the POS system due to a mistake or an attempted theft. In any case, because the ML model is not trained to recognize packaged items, it may fail to identify the item, resulting in inefficient and incorrect processing. The embodiments herein improve the operation of the POS system by enabling it to still be able to complete the checkout process, with accurate results, even though the computer vision system was unable to identify the item. In this case, the method 200 can still proceed to block 220.

At block 220 the POS system displays identification data of the item identified by the shopper and an image of the item captured by the computer vision system. That is, the POS system displays the actual, captured image of the item used by the computer vision system to identify the item along with identification data of the item selected by the shopper. In one embodiment, the identification data can be a representative image (or picture) of the item selected by the user. In another embodiment, the POS system can display a textual description of the item ("You selected a BANANA"), or the PLU number of the item, with the actual image of the item captured by the computer vision system. The POS system can display any kind of identification data corresponding to the shopper's selection. In some examples, the identification data includes a representative image of the item, a three-dimensional graphical representation of the item, a two-dimensional graphical representation of the item, an augmented representation of the of the item, a picture of the item, a textual description of the item, or a PLU number of the item.

In one embodiment, if the identification data is a representative image of the selected item, the representative image is determined in response to the shopper's identification and is not an actual image of the item currently being purchased. That is, while the representative image can be an actual image of an item (e.g., a professional picture of a banana), unlike the captured image, the representative image is not an image of the item currently being purchased at the POS system. For example, the POS system may store a representative image for each item that can be identified by a shopper (e.g., each fresh produce item sold by the store). The representative images can be loaded in the memory of the POS system when the POS system is first being configured for operation (i.e., before the shopper attempts to purchase the item), and can be updated as new items are added to the store's inventory.

Figure 3:
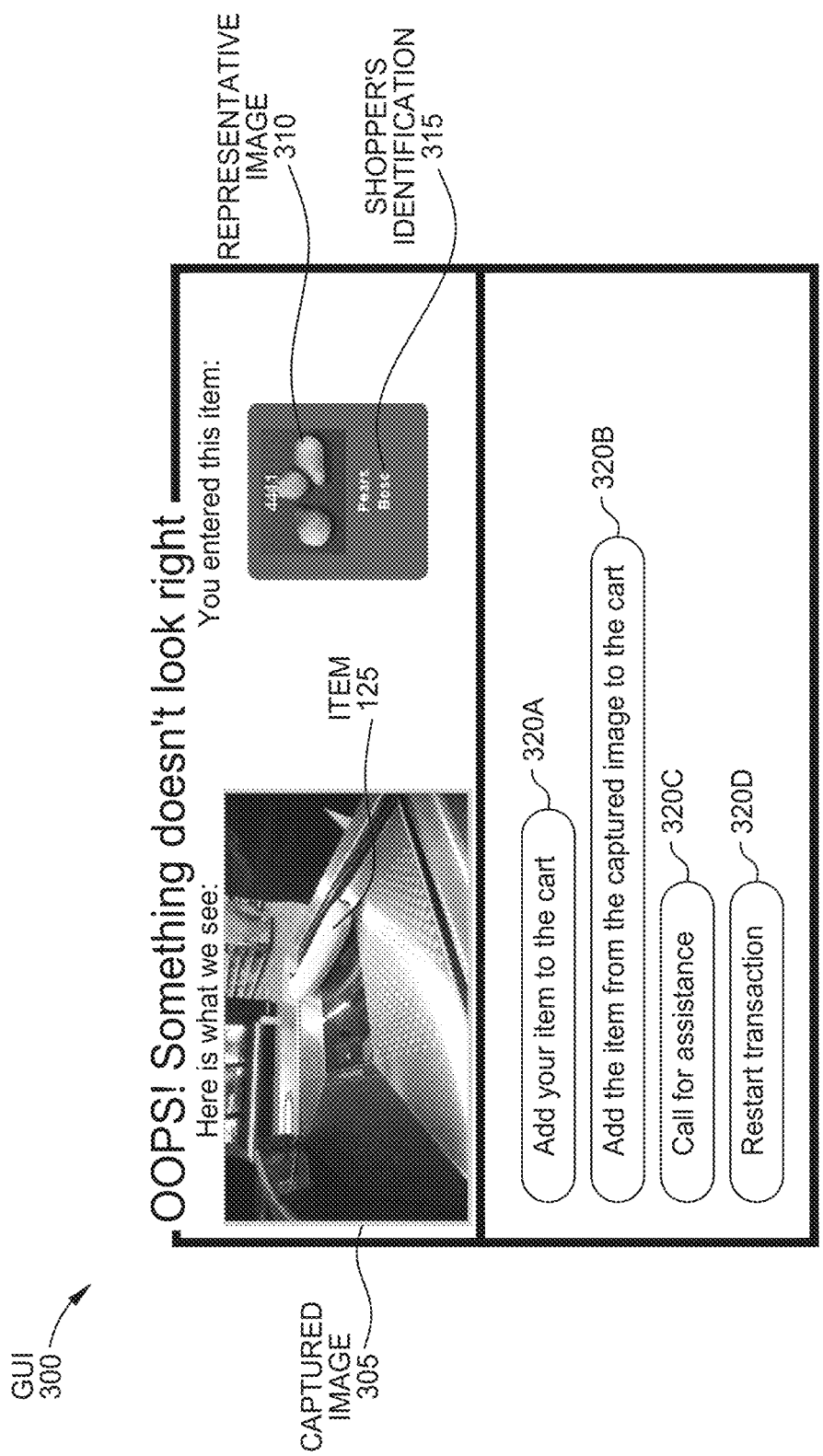
FIG. 3 illustrates a graphical user interface (GUI) for providing feedback to a shopper, according to one embodiment.

FIG. 3 illustrates a GUI 300 for providing feedback to a shopper at block 220. In one embodiment the GUI 300 is displayed on the display screen (e.g., a touchscreen) of the POS system. In FIG. 3, a captured image 305 of the item 125 is displayed in the same GUI 300 as a representative image 310 that corresponds to the shopper's identification 315. Here, the shopper identified the item 125 as a pear, and in response, the GUI 300 illustrates a representative image 310 of the pear, but as mentioned above, could have displayed a textual description of the item 125, the PLU code of the item 125, or any other identification data. However, the computer vision system processed the captured image 305 and either identified the item 125 as something else (e.g., a banana or plantain) or failed to identify the item 125 because it was occluded or the ML model is not trained to recognize that item. In any case, the GUI 300 displays a message (i.e., "OOPS! Something doesn't look right") providing feedback to the shopper that he should compare the captured image 305 to the representative image 310 to ensure he is purchasing the correct item 125.

In this example, FIG. 3 displays the images 305 and 310 side-by-side. The images 305 and 310 can be displayed in a vertical arrangement, or the display can switch between showing the image 305 during a first time period and then show the image 310 during a second time period. The images 305 may be overlaid on top of the interface 300 or representative image 310. Further, the captured image 305 and the representative image 310 may be rendered and displayed as a three dimensional (3D) mesh.

Returning to method 200, at block 225 the POS system determines whether the shopper performed a corrective action. As depicted at GUI 300, interactive buttons 320A-D (which can be virtual buttons on a touch screen or physical buttons on the side of the display) that the shopper can press to perform an action. In some examples, each of the buttons 320A-D corresponds to a different shopper action. Button 320A enables the shopper to add the item identified by the shopper (i.e., the pears) to a shopping cart. For example, the POS system displayed the GUI 300 because the computer vision system determined the item 125 was some other item besides a pear, or the system was unable to identify the item. The shopper can view the captured image 305 and determine the item 125 is indeed what he said it was and use the button 320A to add the item to his cart. In one embodiment, the action corresponding to button 320A is not considered a corrective action since the item is added to the cart without the computer vision system being able to confirm the shopper's identification.

The button 320B corresponds to a corrective action that permits the shopper to add the item identified by the computer vision system to the cart. That is, the shopper may realize the shopper's identification 315 was wrong and add the item the computer vision system identified to the cart instead. In one embodiment, the GUI 300 may also display representative images for the item or items that were identified by the computer vision system, which is discussed below in FIG. 9.

The button 320C corresponds to a corrective action that enables the system to generate one or more graphical element ques and cause the system to display at least one of the graphical element ques at the POS system or third party computing device. In another example, the graphical element que can alert a user that corrective action is needed to complete the transaction.

The button 320D corresponds to a corrective action that enables the POS system to restart the transaction. For instance, the shopper may determine after looking at the captured image 305 that multiple items were captured. The shopper can use the button 320D to restart the method 200 so he can again enter in the identification of the item after the shopper has corrected any problems such as ensuring only one type of item is in the field of view of the camera or rearranging the item so it is clearly visible to the camera.

The buttons 320A-D correspond to just a few of the actions that can be performed by the POS system in response to the computer vision system being unable to confirm the shopper's identification 315 of the item. The embodiments herein can be used with many other types of actions that the shopper can take such as voiding the transaction, entering a different identification of the item, and the like.

Returning to the method 200, if a corrective action was performed such that the computer vision system was able to confirm the shopper's identification, then the method 200 proceeds to block 215 where the item is added to the shopper's checkout list. For example, the POS system may have received the wrong PLU code and instead receive a corrected selection from the shopper of an item identified by the computer vision system to add to the list. Or the items can be rearranged on the POS system (e.g., took the item out of a non-transparent bag or moved it so the camera has a better view of the item) so that the computer vision system can accurately identify the item and confirm it matches the shopper's identification. In any case, if the identification determined by the computer vision system now matches the received identification after the corrective action is performed, the item is added to the list.

However, if the computer vision system is unable to confirm the received identification of the item, the method 200 proceeds to block 230 where the POS system adds the item identified by the shopper to the list. For example, the shopper may have used the button 320A in the GUI 300 to add the item identified by the shopper to the cart despite the fact the computer vision system identified a different item, or was unable to accurately identify the item.

At block 235, the POS system generates a flag indicating that the computer vision system was unable to confirm the shopper's identification of the item. For example, the POS system may push an alert to the store employee in response to the flag. In another embodiment, in response to the flag, the POS system displays an alert on the display screen that overlays a portion of the current GUI being displayed indicating there was a discrepancy. In one embodiment, the POS system may enable the shopper to continue checking out while waiting on the store employee to review the transaction. However, the POS system may prevent the shopper from paying for the items (e.g., presenting legal tender or using a credit card) until the store employee has reviewed the transaction. In another example, the POS system may pause the checkout process and prevent the shopper from adding additional items to the checkout list or cart until the current transaction is reviewed by the store employee.

Figure 4:
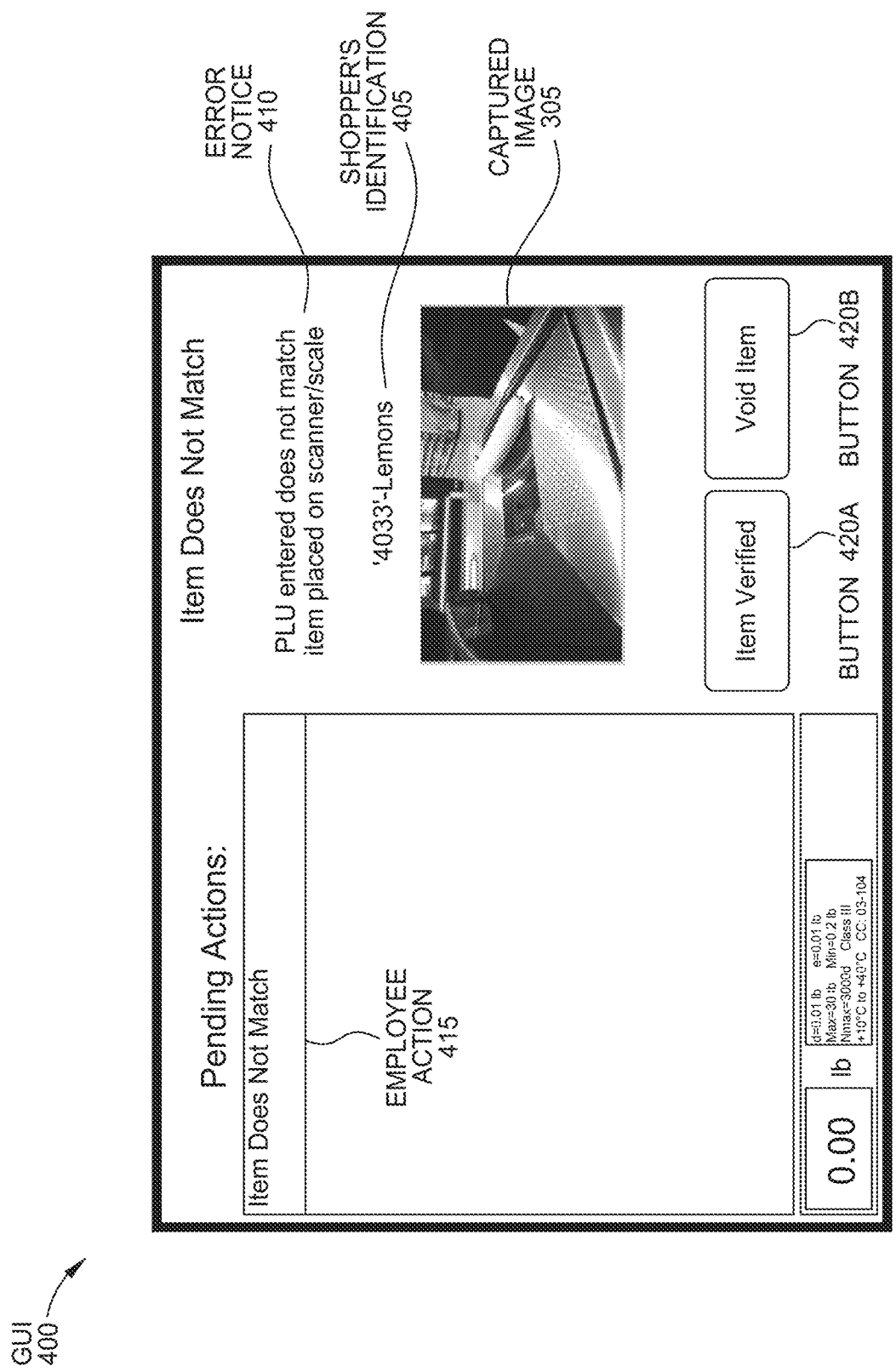
FIG. 4 illustrates a GUI for a store employee to review a shopper's purchase, according to one embodiment.

FIG. 4 illustrates a GUI 400 for a store employee to review a shopper's purchase, according to one embodiment. That is, the GUI 400 may be displayed on the POS system in response to block 235 where a flag was raised, and in response, the store employee is informed of a transaction that was not confirmed by the computer vision system. In one embodiment, the store employee can prompt the POS system to display the GUI 400 after entering an ID or supervisor code. Doing so identifies the store employee to the POS system so it will display the GUI 400, enabling the store employee to review and make changes to the shopper's checkout list or cart.

The GUI 400 displays an employee action 415 corresponding to a problem with the shopper's cart. The GUI 400 also generates and displays a graphical element que (e.g., error notice) 410 and overlays the graphical element display que on top of a portion of the GUI 400. As shown in FIG. 4, the graphical element display que is an error notice 410 describing the specifics of the problem. In other examples, the graphical display que can be an image, graphical icon, graphical flag, 3D object, or the like. The shopper's identification 405 indicates that the items being purchased are lemons but that the computer vision system was either unable to identify the item, or identified a different item. The GUI 400 overlays the captured image 305 of the item which the store employee can compare to the shopper's identification 405 to determine if they match. If the captured image 305 is unclear what the item is (e.g., the item is occluded), the store employee can then look at the items at the POS system to see if they contain the lemons.

The buttons 420A and 420B enable the store employee to verify the item is correct (as identified by the shopper) or void the item so it is removed from the shopper's cart. The store employee can make changes so the items placed in a checkout area of the POS system match the items in the cart. For example, the store employee may need to add items to the shopper's checkout list.

In one example, the method 200 along with the GUIs in FIGS. 3 and 4 can be used to provide feedback to the shopper when an identification of an item provided by the shopper is not confirmed by the computer vision system. The system generates the GUI in FIG. 3 and displays the GUI at the POS system to enable the shopper to perform a corrective action, or to continue with the transaction, after reviewing the image of the item captured by the POS system and the representative image of the item identified by the shopper. The GUI in FIG. 4 provides an interface for a store employee to correct any actions made by the shopper, whether those actions were mistakes or nefarious.

Figure 5:
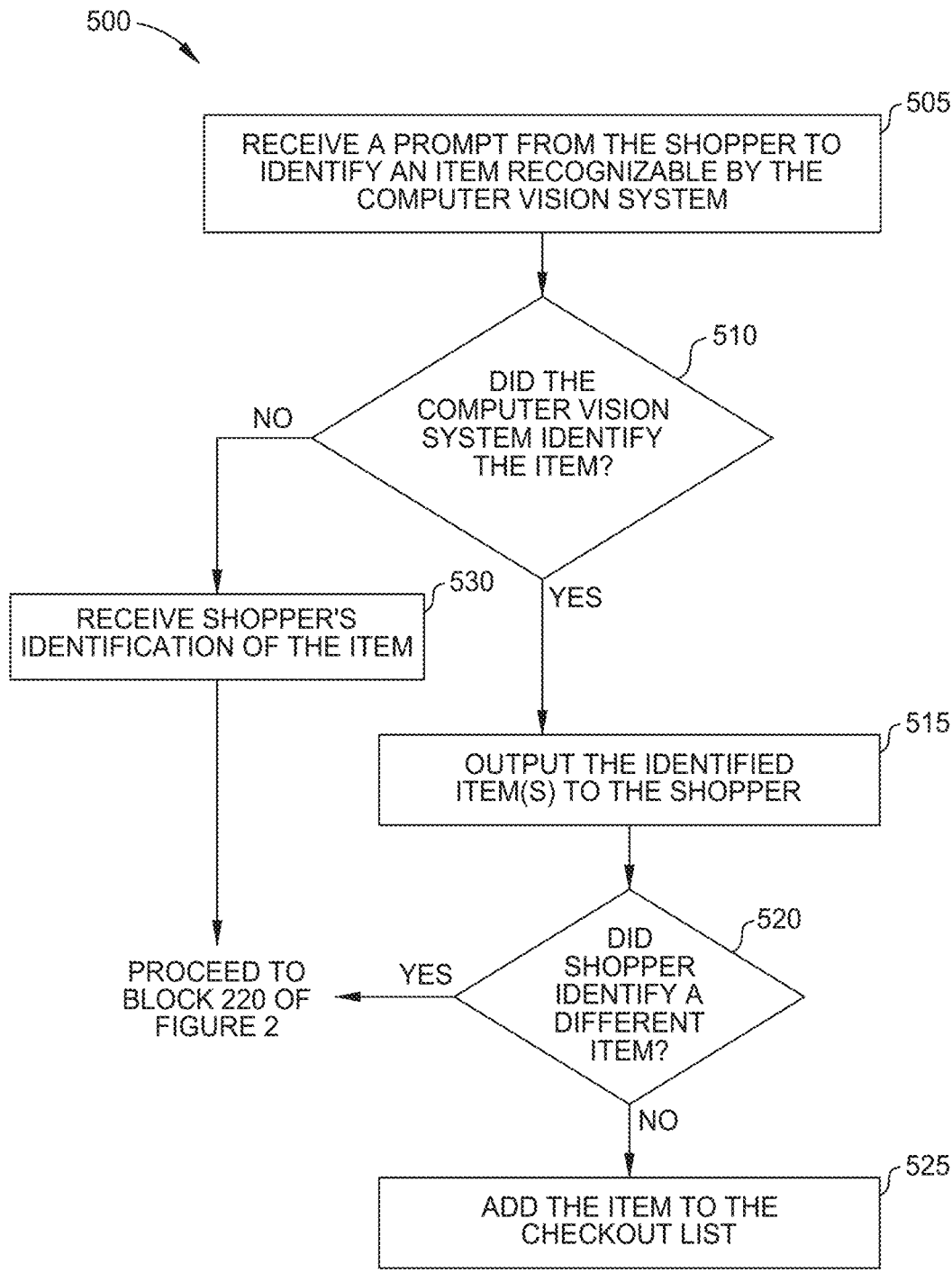
FIG. 5 is a flowchart for providing a shopper with feedback using a computer vision system, according to one embodiment.

FIG. 5 is a flowchart of a method 500 for providing a shopper with feedback using a computer vision system, according to one embodiment. At block 505, as part of a checkout process, the POS system receives a prompt from the shopper to identify an item recognizable by the computer vision system. That is, the shopper may be attempting to add an unpackaged item such as produce or a garden tool to his purchase. As discussed above, the computer vision system can include a ML model to identify unpackaged items. For example, the POS system can capture an image of the item and transmit this image to the computer vision system. The ML model in the computer vision system can then process the image and classify or identify the item. For example, the ML model can predict that the item is a banana based on an image captured by the camera. The ML model can use, e.g., a trained neural network to evaluate the image and then identify the item. When a shopper attempts to purchase one of these items, this prompts the computer vision system to identify the item.

Figure 6:
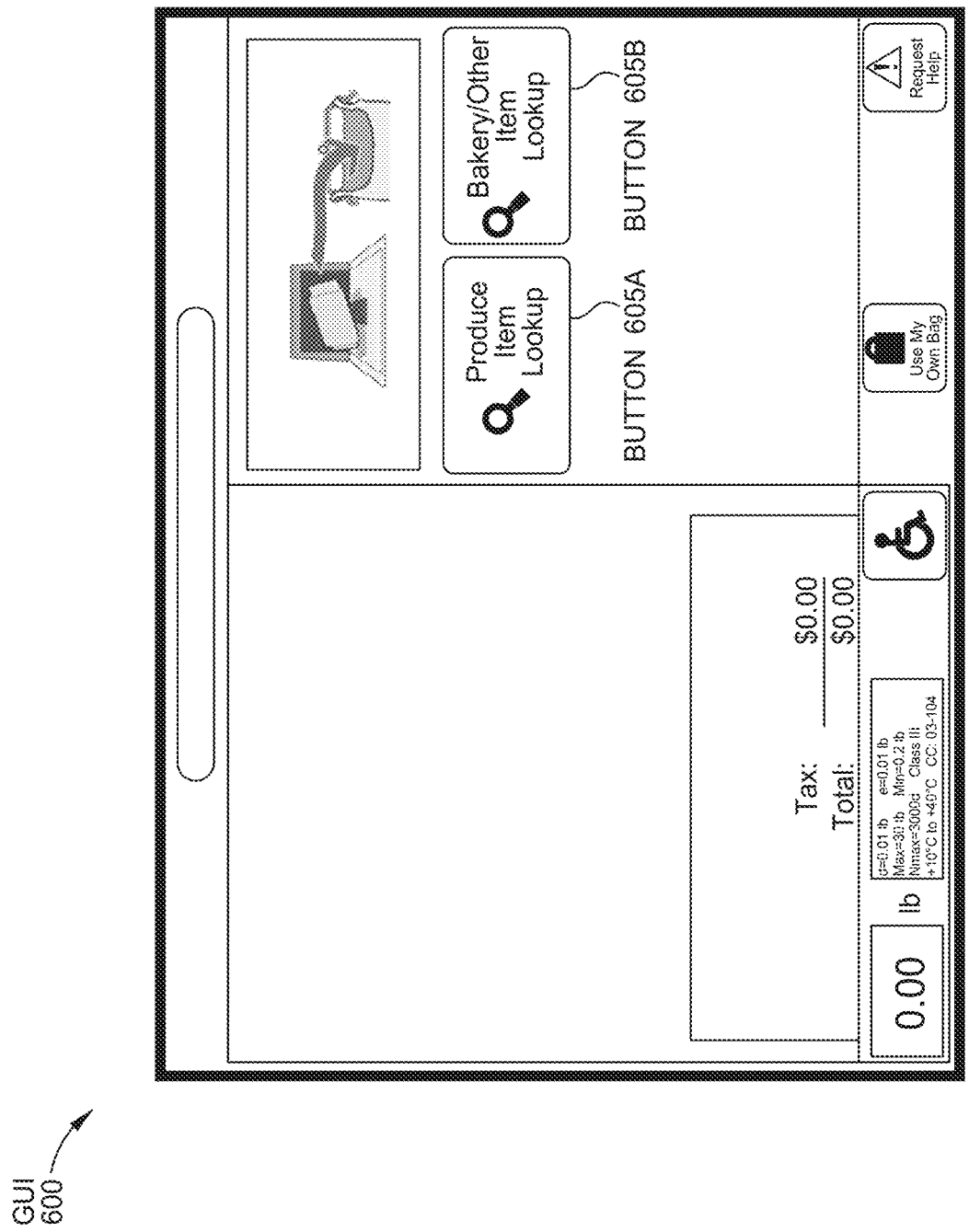
FIG. 6 illustrates a GUI for enabling a shopper to look up an item, according to one embodiment.

FIG. 6 illustrates a GUI 600 for enabling a shopper to look up an item, according to one embodiment. As shown, the GUI 600 includes buttons 605A and 605B that a shopper can press to lookup unpackaged items so they can be added to his cart or checkout list. That is, the shopper may press the buttons 605A and 605B when attempting to purchase an item without a barcode or other identifying mark.

In one embodiment, pressing the buttons 605 prompts the POS system to identify the item using the computer vision system at block 505 of the method 500. That is, pressing one of the buttons 605 informs the POS system the shopper is attempting to purchase an item that should be recognizable to the computer vision system (this assumes the system includes a ML model already trained to recognize these items). In response, the POS system captures an image of the item which is then used as an input to the ML model as discussed above.

Returning to the method 500, at block 510 the POS system determines whether the computer vision system was able to identify the item. The ML model in the computer vision system may use a threshold (e.g., a percentage) to determine whether it has accurately identified the item. If a confidence score (e.g., a percentage indicating the confidence of the ML model in its prediction) of the identification generated by the ML model is below the threshold, it does not provide any results to the POS system. For example, the item may be occluded, or the shopper may have placed an item on the POS system that the ML model is not trained to recognize. However, if the confidence score of the ML model is above the threshold, the computer vision system reports the identified item or items to the POS system.

Figure 7:
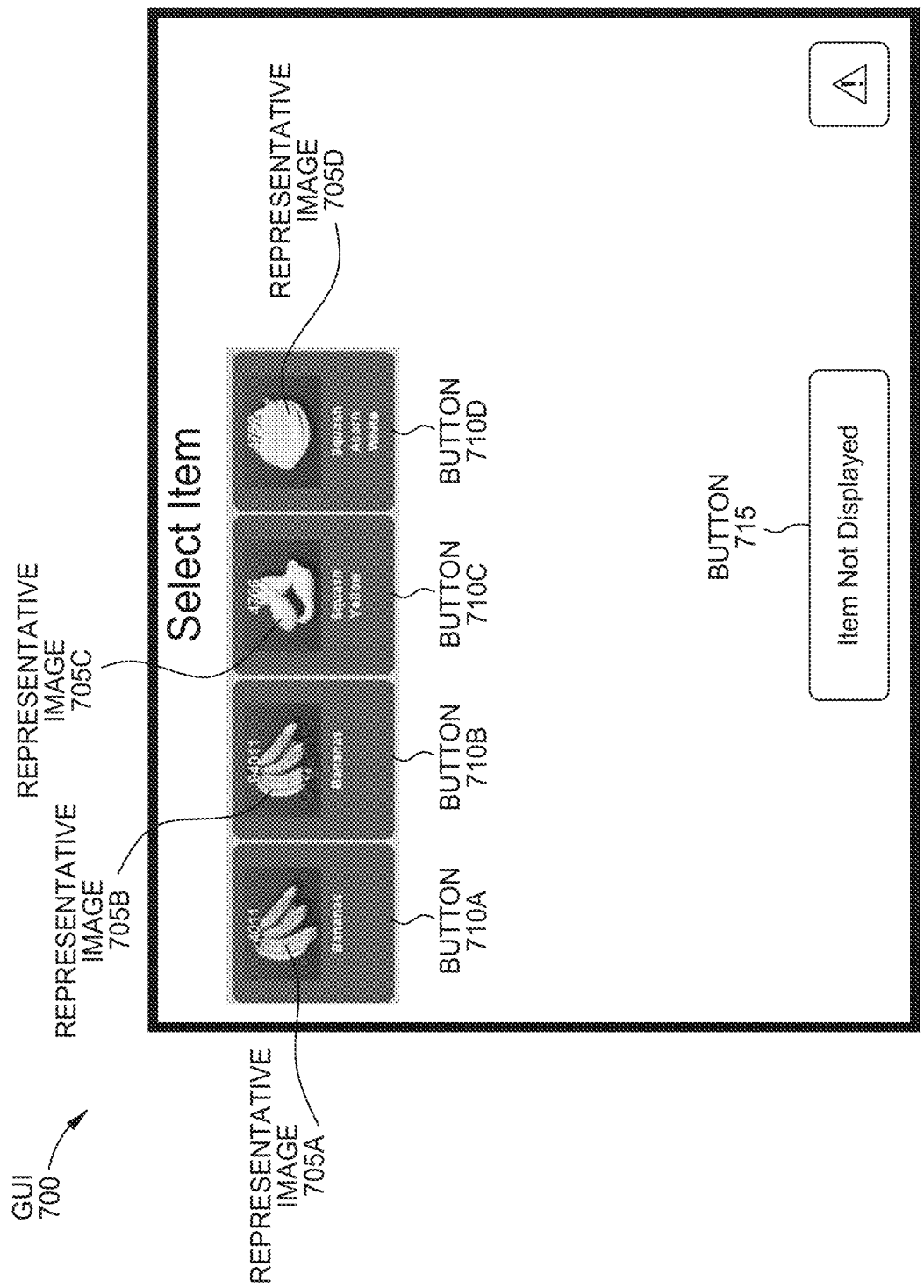
FIG. 7 illustrates a GUI that provides suggestions to a shopper that are identified by a computer vision system, according to one embodiment.

In another example, when the ML model identifies the item, the method 500 proceeds to block 515 where the POS system generates and displays the GUI, which includes the identified item(s), to the shopper, which is shown in FIG. 7. As shown in FIG. 7, a GUI 700 displays suggestions that are identified by a computer vision system to the shopper. The GUI 700 includes buttons 710A-D that each contains a representative image 705A-D. In this example, the ML model identified four different possible identifications of the item (e.g., a plurality of potential items). As such, the buttons 710 each have a different representative image 705 indicating the different produce items identified by the ML model that have a high likelihood of being the item.

The shopper can determine whether one of the representative images 705 matches the item he is currently trying to add to his checkout list. If so, the shopper selects the button 710 containing that image. For example, if the item is organic bananas, the shopper can press the button 710B. However, if the none of the images 705 match the item, then the shopper can press the button 715 to inform the POS system the shopper is attempting to purchase a different item. In this manner, the computer vision system first attempts to identify the item for the shopper before the POS system then asks the shopper to identify the item.

Returning to the method 500, at block 520 the POS system determines whether the shopper identified a different item (e.g., whether the shopper selected the button 715 in FIG. 7). If the shopper selected one of the items identified by the computer vision system (e.g., the shopper selected one of the buttons 710), then the method 500 proceeds to block 525 where the POS system adds the item to the checkout list.

Figure 8:
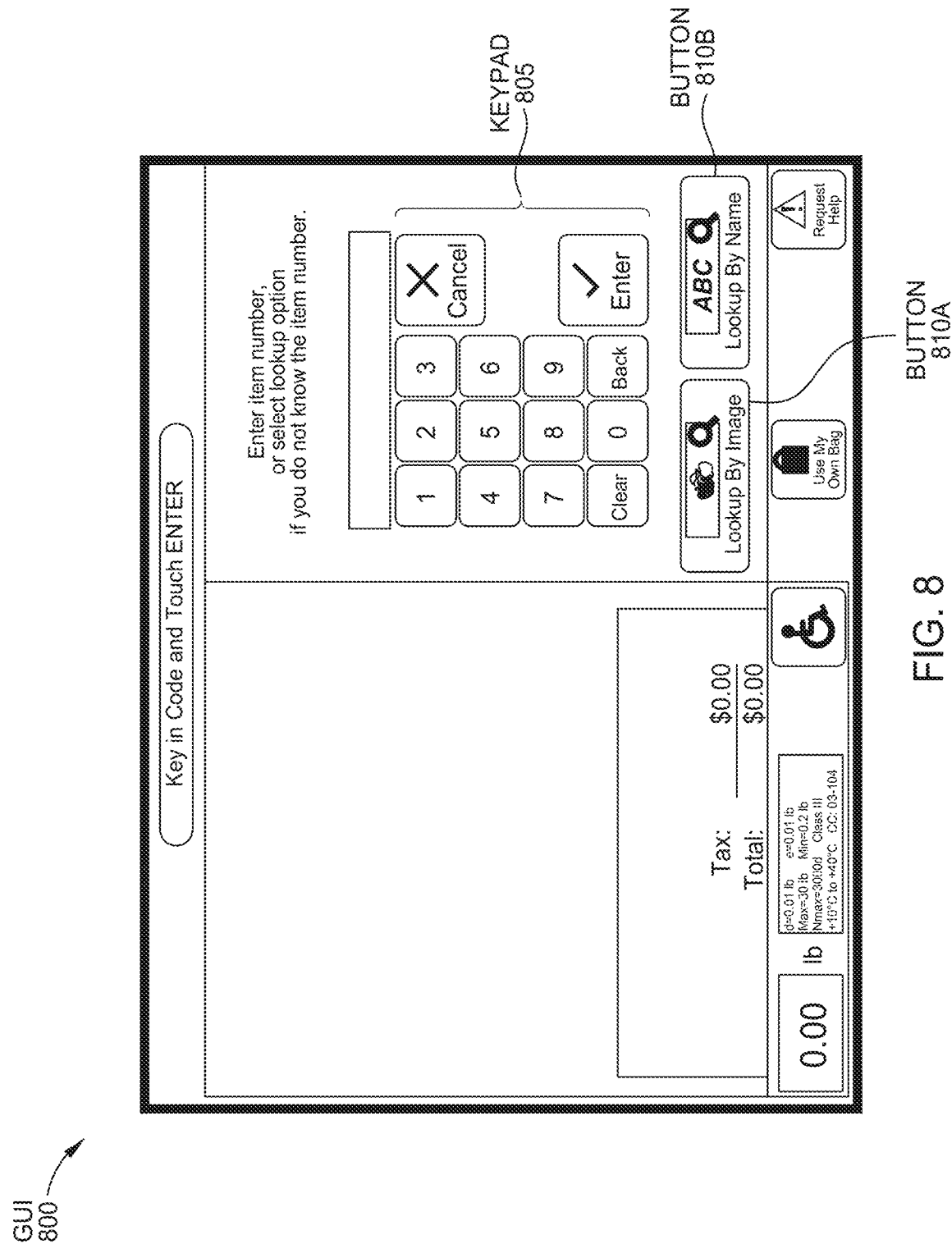
FIG. 8 illustrates a GUI for enabling a shopper to look up an item, according to one embodiment.

However, if the shopper did not select one of the items identified by the computer vision system, the POS system can display the GUI 800 in FIG. 8. That is, FIG. 8 illustrates a GUI 800 for enabling a shopper to look up an item. The GUI 800 includes a keypad 805 that the shopper can use to enter in a code associated with the item (e.g., a PLU code). The GUI 800 also includes a button 810A which the shopper can press to identify the item using images (e.g., images of fruits and vegetables). For example, pressing the button 810A can bring up a different GUI where the shopper can select a category of produce which then brings up other GUIs corresponding to those categories.

The GUI 800 includes a button 810B which causes the POS system to display a keyboard which the shopper can use to type in the name of the item. The GUI 800 is just one example of an interface for enabling the shopper to identify the item.

Once the shopper identifies the item, the method 500 can proceed to block 220 of the method 200 where the POS system displays an image of the item identified by the shopper and the image of the item captured by the computer vision system. In one example, the POS system displays the image of the item to provide feedback to the shopper when the shopper has identified the item as being different from the item(s) identified by the computer vision system (e.g., the items illustrated in FIG. 7). This feedback permits the shopper to correct an honest mistake and also can deter nefarious actors.

Figure 9:
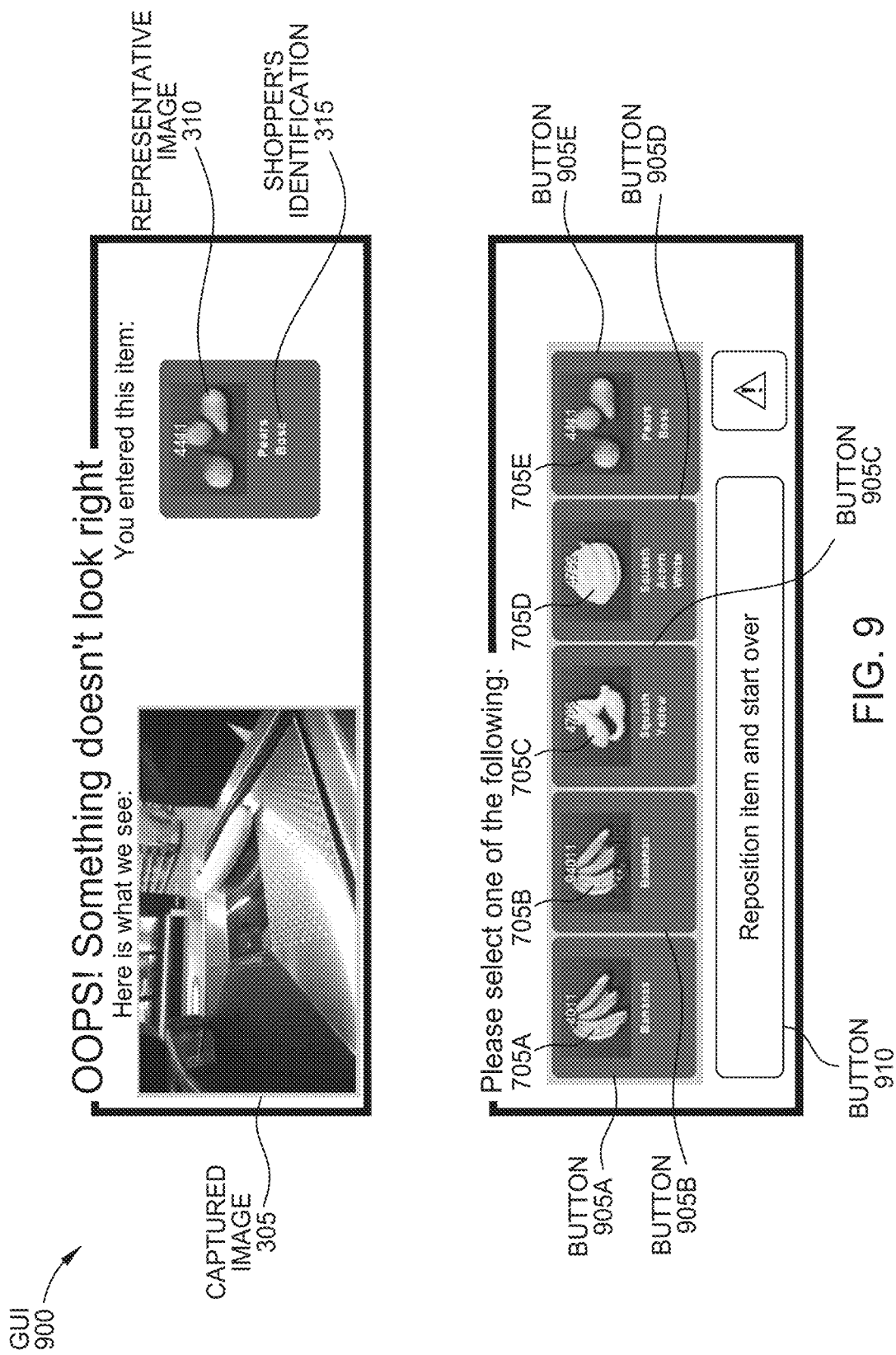
FIG. 9 illustrates a GUI that provides feedback to a shopper when the item entered by the shopper does not match the output of the computer vision system, according to one embodiment.

FIG. 9 illustrates a GUI 900 that provides feedback to a shopper when the item entered by the shopper does not match the determination made by the computer vision system, according to one embodiment. In one example, the GUI 900 is similar to the GUI 300 in FIG. 3 which can be displayed when the shopper identifies an item that is different from the item identified by the computer vision system as described in blocks 515 and 520 of the method 500.

Like the GUI 300 in FIG. 3, the GUI 900 includes the captured image 305 of the item and the representative image 310 derived from the shopper's identification 315 of the item, which the shopper can enter using the GUI 800 in FIG. 8. In addition, the GUI 900 includes buttons 905A-E which the shopper can use to confirm a selection of the item. The buttons 905A-D include representative images 705A-D of the items identified by the computer vision system, while the button 905E includes a representative image 310 of the item identified by the shopper.

Displaying the captured image 305 in the GUI 900 permits the shopper to see the image used by the computer vision system to identify the item. The shopper can then see if there is some reason why the computer vision system identified a different item than the shopper, such as the item is occluded in the image 305, there are multiple items in the image 305, the item may not yet be ripe, etc. If the shopper is a nefarious actor, the GUI 900 provides a subtle warning that the POS system has detected the item and will alert a store employee if the shopper selects the button 905E which corresponds to the item identified by the shopper (i.e., the pears).

The GUI 900 also includes the button 910 that permits the shopper to restart the process. For example, the shopper may want to remove items from the viewing area that should not be there, or remove the item from a bag before restarting the transaction.

Returning to block 510 of the method 500, if the computer vision system could not identify the item (e.g., the item was occluded, there were multiple items, or the ML model was not trained to recognize the item), the method 500 proceeds to block 530 where the POS system receives the shopper's identification of the item. For example, the POS system may display the GUI 800 in FIG. 8 to prompt the shopper to identify the item.

After receiving the shopper's identification, the method 500 proceeds to block 220 where the POS system displays an image of the item identified by the shopper and the image of the item captured by the computer vision system when it attempted to identify the item. In one embodiment, the shopper identifies an item that the computer vision system should have been able to identify. The shopper may have identified the item as one that the ML model in the computer vision system is trained to identify, but it was unable to identify. In some instances, this could be because the item was occluded, there were multiple items, or because the shopper is a nefarious actor who is trying to pass off an expensive item (e.g., meat that the ML model is not trained to recognize) as a less expensive item (e.g. produce that the ML model is trained to recognize). In one example, the POS system displays the image of the item to provide feedback to the shopper if the computer vision system was unable to identify the item.

Figure 10:
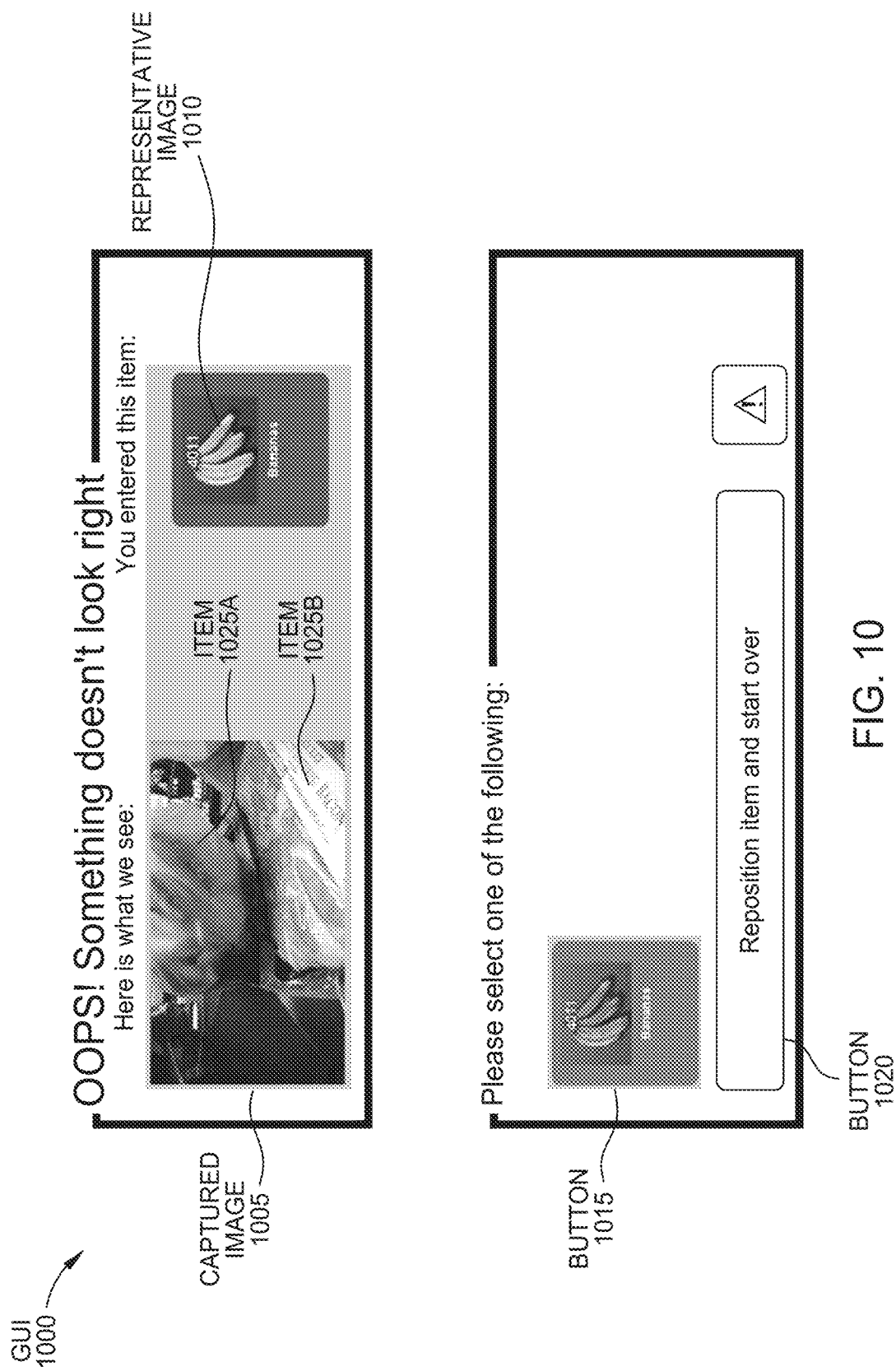
FIG. 10 illustrates a GUI that provides feedback to a shopper when the item entered by the shopper does not match the output of the computer vision system, according to one embodiment.

FIG. 10 illustrates a GUI 1000 that provides feedback to a shopper when the item entered by the shopper is not identifiable by the computer vision system, according to one embodiment. In one example, the GUI 1000 is similar to the GUI 900 in FIG. 9 except that the GUI 1000 does not display items identified by the computer vision system.

The GUI 1000 displays a captured image 1005 of the item and a representative image 1010 derived from the shopper's identification of the item, which the shopper can enter using the GUI 800 in FIG. 8. In addition, the GUI 1000 includes a button 1015 that displays the representative image 1010 of the item identified by the shopper. By pressing the button 1015, the shopper is confirming that he has identified the correct item. As discussed above, the transaction can then be flagged and reviewed by a store employ as discussed in block 235 of FIG. 2.

Showing the captured image 1005 in the GUI 1000 permits the shopper to see the image used by the computer vision system to identify the item. The shopper can then see if there is some reason why the computer vision system was unable to identify the item, such as the item is occluded in the image 1005, there are multiple items in the image 1005, the item may not yet be ripe, etc. If the shopper is a nefarious actor, the GUI 1000 provides a subtle warning that the POS system was unable to confirm the shopper's identification and will alert a store employee if the shopper selects the button 1015.

The GUI 1000 also includes the button 1020 that permits the shopper to restart the process. For example, the shopper may want to remove items from the viewing area that should not be there, or remove the item from a bag before restarting the transaction.

In one embodiment, the computer vision system is unable to identify multiple items from the same image. For example, in GUI 1000, the captured image 1005 includes items 1025A and 1025B. When a captured image has multiple items, the computer vision system may report an error because it is unable to identify a particular item, even if the computer vision system is trained to detect one or both of the items 1025A and 1025B in the image.

Alternatively, the computer vision system may be able to identify multiple items in the same image 1005. In this example, the computer vision system may be able to identify both the head of lettuce (item 1025A) and the meat (item 1025B) in the captured image 1005. In that case, the POS system may display different graphical element que generated by the computer vision system that is overlaid on top of a portion of the GUI 1000. In one example, the different graphical element que represents an augmented message that states, "MULTIPLE ITEMS DETECTED IN THE CHECK-OUT AREA" or "OOPS! Something doesn't look right" and ask the shopper to remove one of the items before restarting the transaction. Further, if one of the items identified by the computer vision system matches the shopper's identification, then the POS system can give instructions to the shopper about which item to remove. For example, if the shopper identified the lettuce, the POS system can instruct the shopper to remove the meat but keep the lettuce in the checkout area. Once the shopper removes the meat and the computer vision system confirms only the lettuce is in the checkout area, the POS system can instruct the shopper to place the lettuce in the bagging area and adds the lettuce to the shopper's checkout list.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements discussed above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described above are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure can include a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   receiving a selected user identification of an item at a point of sale (POS) system;
   receiving an identification of the item from a computer vision system;
   responsive to determining that the identification of the item by the computer vision system does not match the received selected user identification of the item, generating and displaying a graphical user interface (GUI) at the POS system, the GUI comprising identification data associated with the selected user identification of the item, an actual image of the item captured by the computer vision system, and feedback that the selected user identification of the item does not match the actual image of the item displayed in the GUI,
   wherein a first button in the GUI enables the selected user identification to be changed to match the identification of the item by the computer vision system, and a second button in the GUI enables the item corresponding to the selected user identification to be added to a checkout list.

2. The method of claim 1, further comprising, in response to the second button in the GUI being selected, generating a flag indicating that the computer vision system was unable to confirm the selected user identification of the item.

3. The method of claim 1, further comprising:
   identifying, by the computer vision system and based on the actual image, a plurality of potential items; and
   determining, before displaying the GUI, that none of the plurality of potential items identified by the computer vision system match the selected user identification,
   wherein the GUI comprises a plurality of buttons each corresponding to a respective one of the plurality of potential items, wherein selecting one of the plurality of buttons changes the selected user identification to match a corresponding item.

4. The method of claim 1, wherein the identification data is a representative image of the selected user identification of the item and is generated before the item is presented for purchase at the POS system.

5. A point of sale (POS) system, comprising:
   a display;
   a computer vision system;
   a processor; and
   memory storing an application which, when executed by the processor performs an operation, the operation comprising:
   receiving a selected user identification of an item at the POS system;
   receiving an identification of the item from a computer vision system;
   upon determining that the identification of the item by the computer vision system does not match the received selected user identification of the item, outputting onto the display a graphical user interface (GUI) comprising identification data of the selected user identification of the item identified, an actual image of the item captured by the computer vision system, and feedback that the selected user identification of the item does not match the actual image of the item displayed in the GUI,
   wherein a first button in the GUI enables the selected user identification to be changed to match the identification of the item by the computer vision system, and a second button in the GUI enables the item corresponding to the selected user identification to be added to a checkout list.

6. The system of claim 5, further comprising, in response to the second button in the GUI being selected, generating a flag indicating that the computer vision system was unable to confirm the selected identification of the item.

7. The system of claim 5, wherein the operation further comprises:
   identifying, by the computer vision system and based on the actual image, a plurality of potential items; and determining, before displaying the GUI, that none of the plurality of potential items identified by the computer vision system match the selected user identification, wherein the GUI comprises a plurality of buttons each corresponding to a respective one of the plurality of potential items, wherein selecting one of the plurality of buttons changes the selected user identification to match a corresponding item.

8. A computer-readable storage medium having computer-readable program code embodied therewith, the computer-readable program code executable by one or more computer processors to perform an operation, the operation comprising:

receiving a selected user identification of an item at a point of sale (POS) system;

receiving an identification of the item from a computer vision system;

upon determining that the identification of the item by the computer vision system does not match the received selected user identification of the item, transmitting for display, in a graphical user interface (GUI) at the POS system, identification data of the item, an actual image of the item captured by the computer vision system, and feedback that the selected user identification of the item does not match the actual image of the item displayed in the GUI, wherein a first button in the GUI enables the selected user identification to be changed to match the identification of the item by the computer vision system, and a second button in the GUI enables the item corresponding to the selected user identification to be added to a checkout list.

9. The computer-readable storage medium of claim 8, further comprising, in response to the second button in the GUI being selected, generating a flag indicating that the computer vision system was unable to confirm the selected user identification of the item.

* * * * *